(12) United States Patent
Zhang

(10) Patent No.: US 7,263,992 B2
(45) Date of Patent: Sep. 4, 2007

(54) VOLUMETRIC SOLAR RECEIVER

(76) Inventor: Yaoming Zhang, No. 30 Andeli, West Yuhua Road, Nanjing City 210012, Jiangsu Province (CN)

( * ) Notice: Subject to any disclaimer, the term of this patent is extended or adjusted under 35 U.S.C. 154(b) by 267 days.

(21) Appl. No.: 11/054,891

(22) Filed: Feb. 10, 2005

(65) Prior Publication Data

US 2006/0174866 A1   Aug. 10, 2006

(51) Int. Cl.
*F24J 2/50* (2006.01)
*F24J 2/24* (2006.01)
*F24J 2/02* (2006.01)

(52) U.S. Cl. .................. 126/651; 126/652; 126/655; 126/680; 126/709

(58) Field of Classification Search ........... 126/651, 126/652, 655, 657, 648, 680, 704–710, 569, 126/621, 638, 714
See application file for complete search history.

(56) References Cited

U.S. PATENT DOCUMENTS 4,478,210 A * 10/1984 Sieradski .................. 126/570
5,323,764 A    6/1994 Karni et al.
5,421,322 A    6/1995 Karni et al.
6,516,794 B2   2/2003 Karni et al.

* cited by examiner

Primary Examiner—Alfred Basichas
(74) Attorney, Agent, or Firm—Hanley, Flight & Zimmerman, LLC

(57) ABSTRACT

Volumetric solar receivers are disclosed. An illustrated volumetric solar receiver includes a heat absorbing cavity (1), a glass window, and a working fluid inlet pipe (2) and an outlet pipe (3) connecting with the heat absorbing cavity (1). The glass window comprises a double-layer hollow glass (41 and 42). The hollow portion of the glass window forms the inner cavity (43). This inner cavity (43) is provided with an outlet (44) connected to the heat absorbing cavity (1). The working fluid inlet pipe (2) is connected with this inner cavity (43) and further with the heat absorbing cavity (1) via the outlet (44) of this inner cavity. This arrangement keeps the temperature at the glass window low and prevents local overheating, and also avoids waste of heat carried away by the cooling fluid from the glass window.

16 Claims, 4 Drawing Sheets

VOLUMETRIC SOLAR RECEIVER

FIELD OF THE DISCLOSURE

This disclosure relates to a solar receiver, especially a volumetric solar receiver suitable for use on a solar thermal tower power generation device, belonging to the field of technology for utilizing solar energy.

BACKGROUND

Solar energy is an inexhaustible regenerative energy source. Today when the energy situation is so severe, development and utilization of solar energy is one of the important ways to realize a multiple-channel energy supply and to ensure security in the energy supply.

Among the great many forms of solar energy utilization, the thermal tower power generation device is undoubtedly a technical device with great competitiveness. Experiments and research conducted in developed countries has proven that solar thermal power generation is effective for large scale industrialized application. Therefore, energetic development of solar thermal power generation may not only provide us with good clean energy, but may also start the growth of a newly rising industrial group, and may even bring a revolutionary solution to the tense energy problem. Its basic principle is to use a large number of heliostats to reflect the radiated solar energy onto the solar receiver mounted on the top of a high tower, where the medium is heated or the water in the heat collector is directly heated to produce superheated gas, to drive a gas turbine or steam turbine generator to generate electricity, thus converting solar energy into electric energy.

The high temperature solar receiver is the core component of a tower thermal power generation system. Research has been conducted on this technology in a number of countries, mainly in Spain, Israel and the United States. High temperature solar receivers are roughly in two forms: external light receiving type and volumetric. Compared with the latter, the former obviously has higher heat loss, while the latter requires no selective absorbing coating for solar energy under high temperature. The present trend of development of volumetric receivers is that the medium temperature parameter is increasing continuously, making it more suitable to the modern gas turbine—generator cycle with a high temperature parameter. We can sum up the technical plans of typical volumetric receivers as follows: in most existing technical plans, a single-layer quartz glass hood is used as the window to transmit sunlight, (this is clearly described in U.S. Pat. Nos. 5,421,322, 6,516,794 and 5,323,764); secondly, the working fluid passage is designed in various forms on the basis of the heat transfer principle, to minimize the resistance, to homogenize the working fluid, to reduce the heat loss as much as possible, and to reduce local overheating and stress resulting from thermal expansion. They have the following drawbacks. First, with a single-layer quartz glass hood as the window to transmit sunlight, it is in direct contact with the working fluid under high temperature and high pressure. Although it is possible for cold working fluid to flow along the surface wall of the glass hood in the flow design of the fluid, the actual flow conditions of fluid would be much more complicated than those designed and envisaged, and the expected result cannot be fully met. Therefore, a local high temperature may develop on the glass hood, making it likely to crack or break. Second, the single-layer quartz glass hood will be at a high temperature. Therefore, cold fluid must be used to cool it in the design. The plan proposed in U.S. Pat. No. 5,421,322 is to admit cold fluid respectively on the inner and outer walls of the glass hood. However, when the fluid entering from the light incident end flows along the glass outer wall, the heat will be carried away by the fluid, and it would be very difficult to make full use of the fluid thus heated. Therefore, although it has cooled the glass hood, it does not favor increase of heat efficiency. Third, a more outstanding issue is that most receivers can only absorb heat, while the heat reservation function required when there is insufficient sunlight is provided by a separate heat reservation device, not as part of the receiver.

DETAILED DESCRIPTION

EXAMPLE 1

Figure 1:
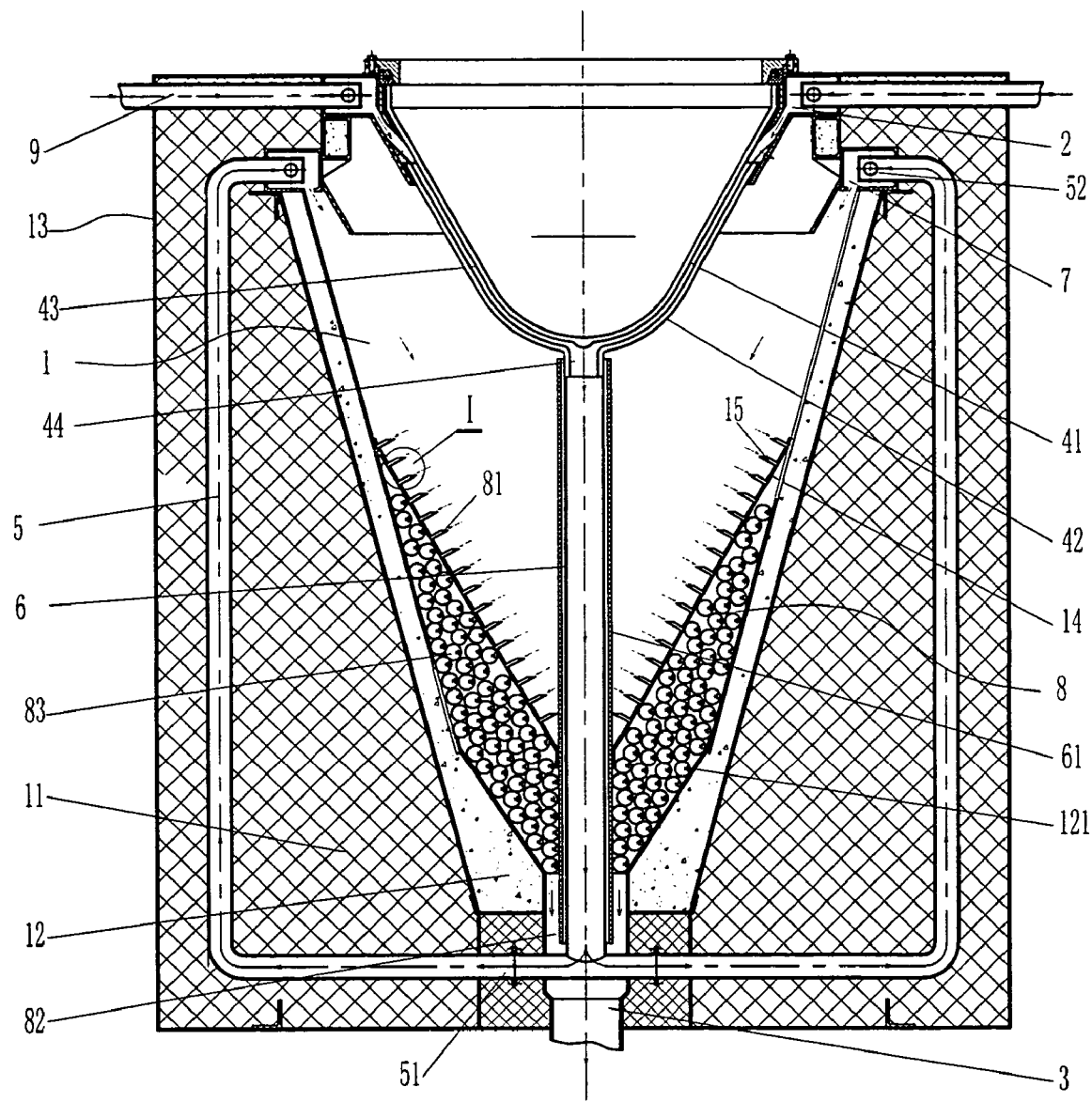
FIG. 1 is a schematic illustration of a first example device constructed in accordance with the teachings of the invention.

An example volumetric solar receiver is schematically shown in FIG. 1. The receiver includes a heat absorbing cavity 1, a glass window to receive incoming sunlight on the heat absorbing cavity 1, a working fluid inlet pipe 2 and a working fluid outlet pipe 3 connected to the heat absorbing cavity 1. The glass window includes two layers of glass 41 and 42. The hollow section between the double layers of glass 41 and 42 forms the inner cavity 43. This inner cavity 43 is provided with an outlet 44 connected with the heat absorbing cavity 1. The working fluid inlet pipe 2 is connected with this inner cavity 43 and further connected to the cavity 1 via the outlet 44 of this inner cavity 43. In this way, since the glass window includes double-layer hollow glass, the cold working fluid can flow quickly through the inner cavity 43 formed by the double-layer hollow glass, to carry away the heat quickly and to provide good cooling of the glass window, thus avoiding softening, cracking and breaking of the glass window due to a local high temperature, and increasing the service life of the glass window. Furthermore, because this inner cavity 43 is provided with the outlet 44 connected with the heat absorbing cavity 1, the cold working fluid, after flowing through inner cavity 43, can flow into the heat absorbing cavity 1 via this outlet 44, and flow out from the outlet pipe 3 as a high temperature and high pressure working fluid, thereby avoiding waste of heat caused by cooling of the glass window.

As shown in FIG. 1, to prevent heat dissipation from the heat absorbing cavity, the heat absorbing cavity 1 can be wrapped externally with an insulation layer 11. A refractory layer 12 can be provided between this insulation layer 11 and the heat absorbing cavity 1. A shell 13 can be provided outside the insulation layer 11.

In the example shown in FIG. 1, a preheating passage 5 can be provided inside the insulation layer 11. This preheating passage is connected at one end 51 to the outlet 44 of the inner cavity 43 of the double-layer hollow glass via a flow collecting pipe 6, and at the other end 52 to the heat absorbing cavity 1 via a secondary inlet pipe 7. The cold working fluid in the inner cavity 43 of the double-layer hollow glass can flow into the flow collecting pipe 6 via the outlet 44 of the inner cavity 43, be preheated in the preheating passage 5 in the insulation layer 11, enter the heat absorbing cavity 1 via the secondary inlet pipe 7 connected to heat absorbing cavity 1, and finally flow out from the outlet pipe 3 as a working fluid at high temperature and high pressure. In this way, the illustrated example has made full use of the preheating passage 5 to receive the radiated energy in the insulation layer 11 and/or the refractory layer 12 to preheat the cold working fluid, and allows it to flow into the heat absorbing cavity 1 again, to achieve the effect of comprehensive utilization. Furthermore, the fluid in the preheating passage 5 is not at a high temperature, which can also cool the materials of the insulation layer and/or refractory layer, to prolong their service life.

In the illustrated example, the glass window can be in a concave shape as shown in FIG. 1, to reduce dissipation of sunlight. Both the working fluid inlet pipe 2 and the secondary inlet pipe 7 are ring pipes around the concave glass window. The ring pipes are provided with small holes or slots allowing fluid to flow to the double-layer glass inner cavity 43 and heat absorbing cavity 1. The flow collecting pipe 6 is made of quartz glass resisting high temperature, and the pipe is protected by a high temperature ceramic sleeve 61.

In the example shown in FIG. 1, a heat reserving cavity 8 can be further provided behind the heat absorbing cavity 1. This heat reserving cavity 8 is provided with the fluid inlet 81 connected to the heat absorbing cavity 1 and the fluid outlet 82 connected to the working fluid outlet pipe 3. The working fluid outlet pipe 3 is connected to the heat absorbing cavity 1 via this fluid outlet 82 and inlet 81. The inside of this heat reserving cavity 8 is filled with heat reserving material 83 of a high heat capacity. In this way, part of the heat in the heat absorbing cavity 1 can be reserved in the heat reserving cavity 8 by the heat reserving material 83 of a high heat capacity, and when the sunlight is not sufficient for a short period of time, the heat reserved in the heat reserving cavity 8 can be directly used to meet the demand for power generation. This arrangement has integrated the heat absorbing and reserving functions for the illustrated volumetric solar receiver, achieving high efficiency and good practicability.

In the example shown in FIG. 1, the heat reserving material 83 filled in the heat reserving cavity 8 is of spherical shape.

Figure 2:
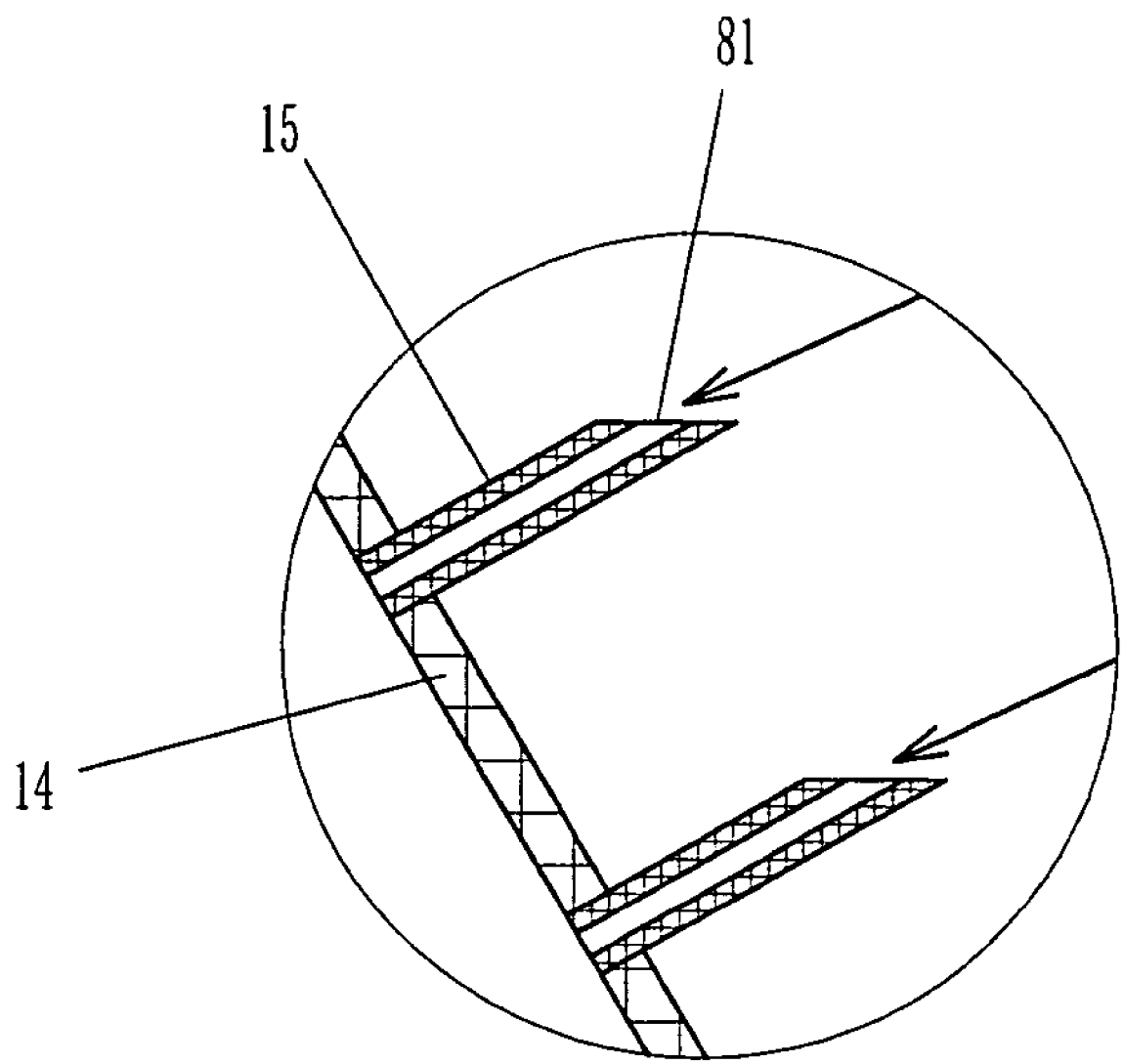
FIG. 2 is an enlarged view of area I of FIG. 1.

In the example shown in FIG. 1, the part of the heat absorbing cavity 1 opposite to the glass window can be surrounded by a heat absorbing mass 14. This heat absorbing mass 14 is a hood shaped member of high temperature metal or ceramics. The heat reserving cavity 8 can include the hood shaped heat absorbing mass 14 and the outer wall 121 of the refractory layer 12. As shown in FIG. 2, a number of small holes are provided on the surface of this heat absorbing mass 14. Tubular absorbers 15 protruding to the heat absorbing cavity 1 are provided at these holes. The tube mouths of these tubular absorbers 15 constitute the fluid inlet 81 on the heat reserving cavity 8. These tubular absorbers 15 in a large number form an array of absorbers, not only increasing the area of heat absorption, but also intersecting the flow direction of working fluid with tubular absorbers 15, to achieve improved heat exchange.

The illustrated example solar receiver can be in a symmetrical layout as a whole. The above-mentioned outlet pipe 3 and flow collecting pipe 6 can be arranged coaxial with the symmetrical axis of the solar receiver in overall symmetrical layout.

The cold working fluid in the illustrated example can output to the working fluid inlet pipe 2 via an input pipe 9 before entering the double-layer glass inner cavity 43.

In the illustrated example, the working fluid flows in the following manner. First, the cold fluid under high pressure enters the working fluid inlet pipe 2 via input pipe 9. It then flows into the inner cavity 43 formed by the double-layer glass 41 and 42 via the small holes or slots on the ring pipes, and quickly carries away the heat on the double-layer glass, to provide proper cooling of the double-layer glass. The working fluid then flows via the flow collecting pipe 6 into preheating passage 5, where the working fluid is properly preheated by the radiation effect of the refractory layer 12 and insulation layer 11. The fluid then enters the secondary inlet pipe 7 and is further sent into the heat absorbing cavity 1. Because of the heat absorbing function of the heat absorber 14, the temperature and pressure of the working fluid rise rapidly. The working fluid enters the heat reserving cavity 8 via the tubular absorbers 15 and, after passing the fluid outlet 82 of the heat reserving cavity 8, it finally flows out from the working fluid outlet pipe 3.

Persons of ordinary skill in the art will appreciate from the above description that the illustrated example volumetric solar receiver features a rational flow route of working fluid with stable flow status, low heat loss, homogeneous heating and high efficiency, with high applicability.

EMBODIMENT 2

Figure 3:
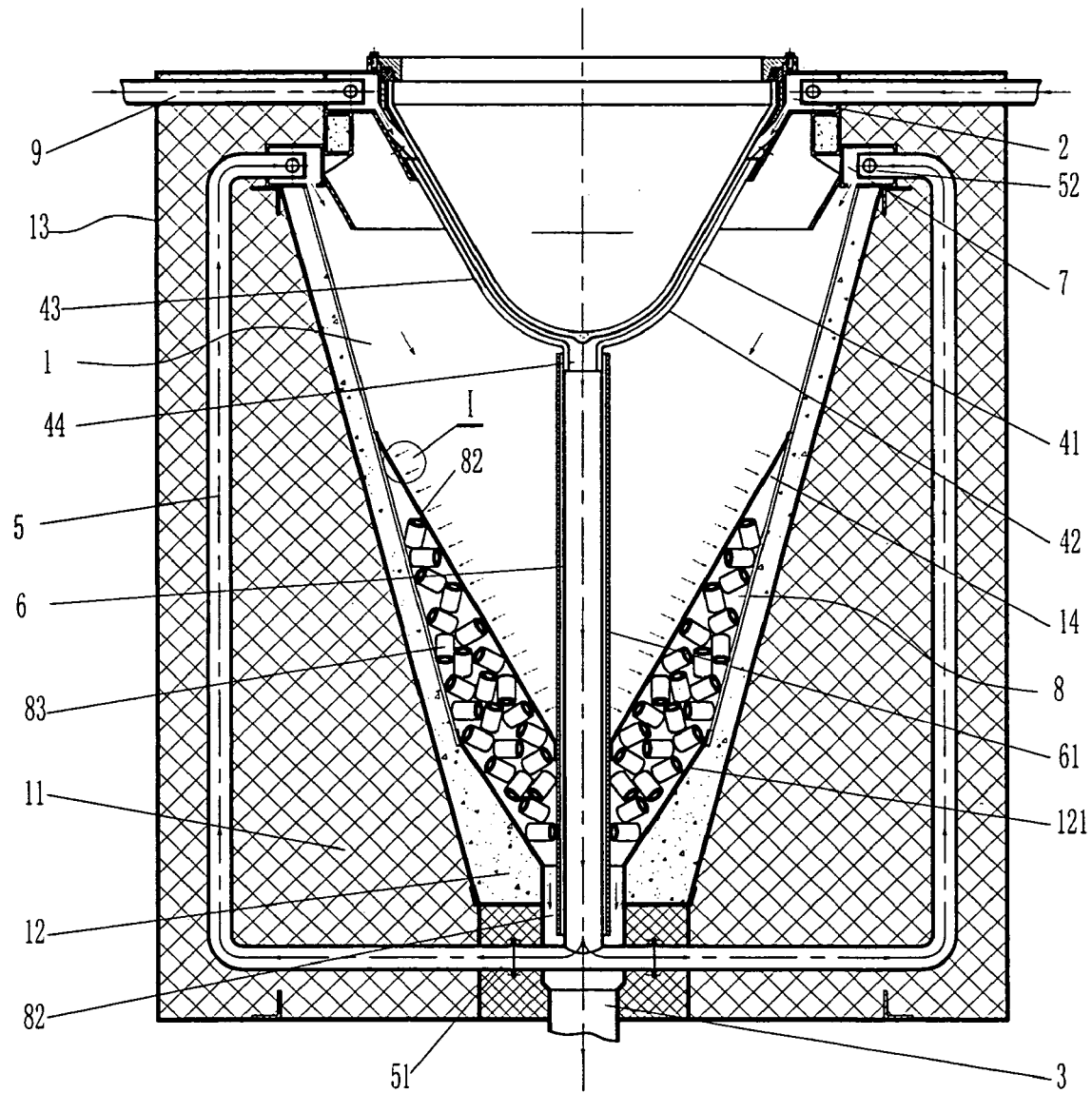
FIG. 3 is a schematic illustration of a second example device constructed in accordance with the teachings of the invention.
Figure 4:
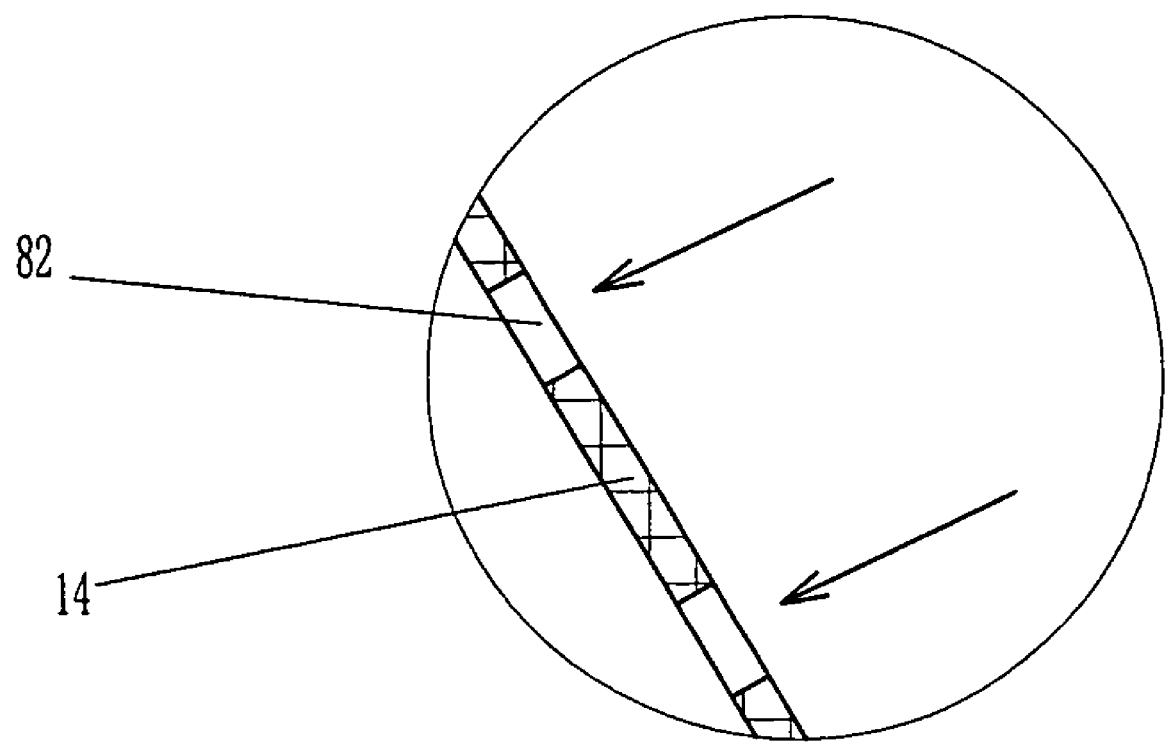
FIG. 4 is an enlarged view of area I of FIG. 3.

The basic structure of the second example volumetric solar receiver shown in FIGS. 3 and 4 is similar to that of the first example volumetric solar receiver shown in FIGS. 1 and 2. Accordingly, that description will not be repeated here.

As shown in FIGS. 3 and 4, the second example volumetric solar receiver is distinguishable from the first example volumetric solar receiver in that, there are some small holes on the surface of the heat absorber 14 of the second example volumetric solar receiver to permit fluid to flow to the heat reserving cavity 8, and these small holes directly form the fluid inlet on the heat reserving cavity 8. The working fluid in the heat absorbing cavity 1 can directly enter the heat reserving cavity 8 via these small holes, and then flow out via the working fluid outlet pipe 3 through fluid outlet 82.

In the example shown in FIG. 3, the heat reserving material 83 filled in the heat absorbing cavity 1 can be a tubular material.

As the example of FIGS. 3 and 4 is identical to the example of FIGS. 1 and 2 in basic structure, it can produce the same beneficial effect as those described above in connection with the first example receiver. Therefore, those effects are not re-described in detail here.

From the foregoing, persons of ordinary skill in the art will appreciate that volumetric solar receivers have been provided, in which the temperature at the glass window is relatively low, to prevent local overheating, and also to avoid waste of heat that is carried away by the cold working fluid from the glass window.

Persons of ordinary skill in the art will also appreciate that volumetric solar receivers have been disclosed herein, which can make full use of the radiated energy produced by the receiver to preheat the cold working fluid, to achieve the effect of comprehensive utilization.

Persons of ordinary skill in the art will also appreciate that volumetric solar receivers have been provided, which also have the function of heat absorbing and reservation, and are, thus, able to directly meet the requirement of heat reservation for power generation when there is insufficient sunlight for a short period of time.

A disclosed volumetric solar receiver includes a heat absorbing cavity, a glass window provided on the heat absorbing cavity to receive incoming sunlight, and an inlet pipe and outlet pipe for working fluid connected on the heat absorbing cavity. The glass window comprises double-layer hollow glass. The hollow portion of this double-layer hollow glass forms the inner cavity. This inner cavity has an outlet connected with the heat absorbing cavity. The working fluid inlet pipe is connected to this inner cavity and further to the heat absorbing cavity via the outlet of this inner cavity.

Because the glass window comprises the double-layer hollow glass and the cold working fluid can quickly pass through the inner cavity formed by this double-layer hollow glass, it can quickly carry away the heat and provide good cooling to the glass window.

To prevent heat loss from the heat absorbing cavity, the heat absorbing cavity can be externally covered with an insulation layer. A refractory layer can be provided between this insulation layer and the heat absorbing cavity. A shell can be provided outside the insulation layer. Further, a preheating passage can be provided in the insulation layer, with one end of this preheating passage connected to the outlet of the inner cavity of the double-layer hollow glass via a flow collecting pipe, and the other end connected to the heat absorbing cavity via the secondary inlet pipe. The cold working fluid in the inner cavity of the double-layer hollow glass flows into the flow collecting pipe via the outlet of this inner cavity, and is further preheated in the preheating passage in the insulation layer. It then enters the heat absorbing cavity via the secondary inlet pipe connected with the heat absorbing cavity, and finally flows out from the outlet pipe as a working fluid at high temperature and high pressure. In this way, the illustrated example receivers make full use of the preheating passage to receive the radiated energy reserved in the insulation layer and/or the refractory layer to preheat the cold working fluid before it flows into the heat absorbing cavity, to achieve comprehensive utilization Further, the fluid after preheating in the preheating passage is not at a high temperature, which in turn cools the insulation layer material and/or refractory material, and can prolong their service life.

The flow collecting pipe can be a quartz glass pipe withstanding high temperature. This flow collecting pipe can be protected by a sleeve made of high temperature ceramics.

To minimize dissipation of sunlight from the glass window, the glass window can be designed in a concave form.

The working fluid inlet pipe can be, for example, a ring pipe arranged around the glass window. A small hole or slot is preferably provided on this ring pipe to allow the fluid to flow into the double-layer hollow glass inner cavity.

The secondary inlet pipe can also be a ring pipe arranged around the glass window. A small hole or slot is preferably provided on this ring pipe to allow the fluid to flow to the heat absorbing cavity.

In the illustrated examples, a heat reserving cavity can further be provided behind the heat absorbing cavity. This heat reserving cavity is provided with a fluid inlet connected with the heat absorbing cavity and a fluid outlet connected with the working fluid outlet pipe. The working fluid outlet pipe is connected with the heat absorbing cavity via this fluid outlet and inlet. This heat reserving cavity is filled with heat reserving material of high heat capacity. Thus, part of the heat in the heat absorbing cavity can be reserved in the heat reserving cavity by the heat reserving material of high heat capacity, and when the sunlight is not sufficient for a short period of time, the heat reserved in the heat reserving cavity can be directly used to meet the demand for power generation. This arrangement has integrated the heat absorbing and reserving functions for the volumetric solar receiver, thereby achieving high efficiency and good practicability.

The heat reserving material filled in the heat reserving cavity can be sphere shaped, tube shaped or block shaped.

The part of the heat absorbing cavity opposite to the glass window can be surrounded by a heat absorbing mass, which is a hood shaped member of high temperature metal or ceramics. On the surface of this heat absorbing mass there are a number of small holes allowing fluid to flow into the heat reserving cavity, and these holes constitute the fluid inlet on the heat reserving cavity; or, the surface of this heat absorbing mass is provided with some small holes, and tubular absorbers protruding to the heat absorbing cavity are provided at these holes, and the tube mouths of these tubular absorbers constitute the fluid inlet on the heat reserving cavity.

The disclosed example solar receivers can be in a symmetrical layout as a whole. The outlet pipe, and flow collecting pipe are arranged coaxial with the symmetrical axis of the solar receiver in a symmetrical layout as a whole.

The illustrated devices feature a scientific structure, rational flow route of working fluid with stable flow status, low heat loss, homogeneous heating and high efficiency, with high applicability.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A volumetric solar receiver comprising:
a heat absorbing cavity;
a glass window on the heat absorbing cavity to receive incoming sunlight; and
a working fluid inlet pipe and working fluid outlet pipe connected to the heat absorbing cavity, wherein the glass window comprises a double-layer hollow glass, a hollow portion of the double-layer hollow glass forms an inner cavity which is provided with an outlet connecting to the heat absorbing cavity, and the working fluid inlet pipe is connected with the inner cavity and further with the heat absorbing cavity via the outlet of the inner cavity, wherein the heat absorbing cavity is covered externally with an insulation layer and a preheating passage is provided in the insulation layer, the preheating passage is connected at one end to the outlet of the inner cavity of the double-layer hollow glass via a flow collecting pipe, and at the other end to the heat absorbing cavity via a secondary inlet pipe.

2. A volumetric solar receiver as described in claim 1, wherein a refractory layer is located between the insulation layer and the heat absorbing cavity, and a shell is located outside the insulation layer.

3. A volumetric solar receiver as described in claim 1, wherein the flow collecting pipe is made with material which is resistant to high temperature.

4. A volumetric solar receiver as described in claim 3, wherein the flow collecting pipe is protected by a sleeve which is resistant to high temperature.

5. A volumetric solar receiver as described in claim 1, wherein the glass window has a concave shape.

6. A volumetric solar receiver as described in claim 1, wherein the working fluid inlet pipe is a ring pipe arranged around the glass window, and the ring pipe is provided with small holes or slots to permit fluid to flow into the double-layer hollow glass inner cavity.

7. A volumetric solar receiver as described in claim 1, wherein the secondary inlet pipe is a ring pipe arranged around the glass window, and the ring pipe is provided with small holes or slots to permit fluid to flow into the heat absorbing cavity.

8. A volumetric solar receiver as described in claim 1, wherein a part of the heat absorbing cavity opposite to the glass window is surrounded by a heat absorbing mass, and the heat absorbing mass is a metal or ceramic hood shaped member able to withstanding high temperature.

9. A volumetric solar receiver as described in claim 1, wherein the solar receiver has a substantially symmetrical layout.

10. A volumetric solar receiver as described in claim 1, wherein the solar receiver has a substantially symmetrical layout.

11. A volumetric solar receiver as described in claim 10, wherein the outlet pipe and the flow collecting pipe are arranged coaxial with a symmetrical axis of the solar receiver in a substantially symmetrical layout.

12. A volumetric solar receiver comprising:
   a heat absorbing cavity;
   a glass window on the heat absorbing cavity to receive incoming sunlight; and
   a working fluid inlet pipe and working fluid outlet pipe connected to the heat absorbing cavity, wherein the glass window comprises a double-layer hollow glass, a hollow portion of the double-layer hollow glass forms an inner cavity which is provided with an outlet connecting to the heat absorbing cavity, and the working fluid inlet pipe is connected with the inner cavity and further with the heat absorbing cavity via the outlet of the inner cavity, wherein a heat reserving cavity is provided behind the heat absorbing cavity, the heat reserving cavity is provided with a fluid inlet connected to the heat absorbing cavity and a fluid outlet connected to the working fluid outlet pipe, the working fluid outlet pipe is connected to the heat absorbing cavity via the fluid outlet and inlet, and the heat reserving cavity is filled with heat reserving material of high heat capacity.

13. A volumetric solar receiver as described in claim 12, wherein the heat reserving material inside the heat reserving cavity is spherical, tubular or block shaped.

14. A volumetric solar receiver as described in claim 12, wherein a part of the heat absorbing cavity opposite to the glass window is surrounded by a heat absorbing mass, and the heat absorbing mass is a metal or ceramic hood shaped member able to withstanding high temperature.

15. A volumetric solar receiver as described in claim 14, wherein the heat absorbing mass has a number of small holes on a surface to permit fluid to flow into the heat reserving cavity, and these small holes constitute the fluid inlet on the heat reserving cavity.

16. A volumetric solar receiver as described in claim 14, wherein the heat absorbing mass has a number of small holes on the surface, tubular absorbers protrude into the heat absorbing cavity via these small holes, and pipe mouths of the tubular absorbers constitute the fluid inlet on the heat reserving cavity.

* * * * *